July 28, 1953 W. G. HEILPERN ET AL 2647,256
RADAR SYSTEM
Filed June 21, 1949 5 Sheets-Sheet 1

Inventors:
Walter Gerhard Heilpern
Ernst Vogt
by Walter S. Pleston
ATTORNEY

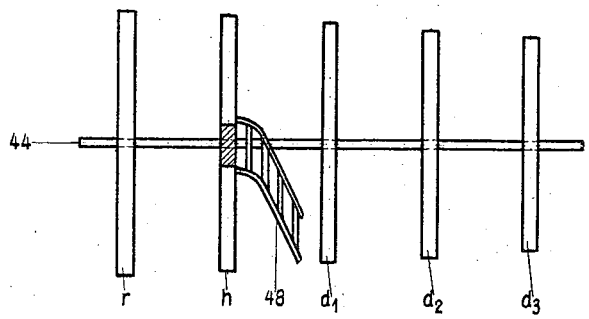
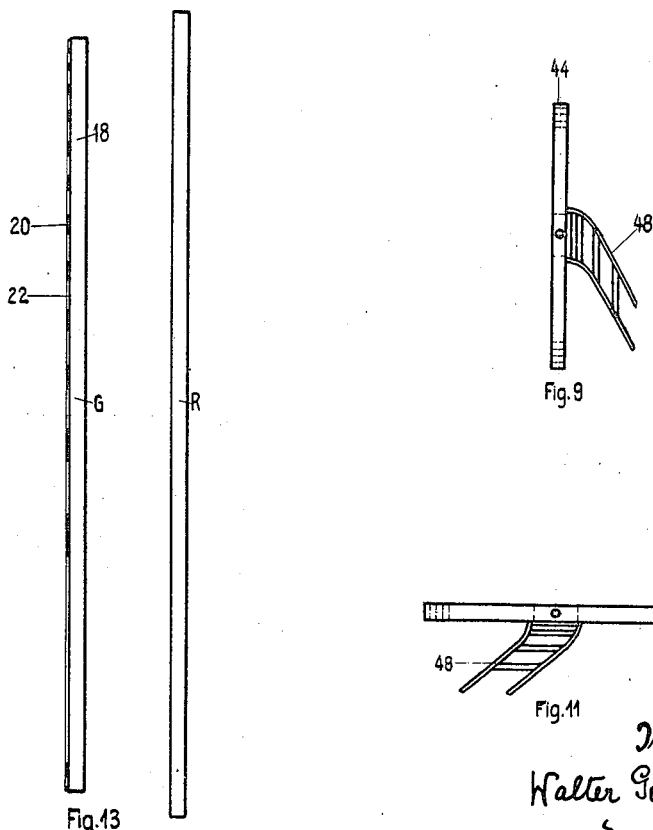

July 28, 1953 W. G. HEILPERN ET AL 2647,256
RADAR SYSTEM
Filed June 21, 1949 5 Sheets-Sheet 5

Inventors:
Walter Gerhard Heilpern
Ernst Vogt
by Walter S. Bleston
ATTORNEY

Patented July 28, 1953

2,647,256

UNITED STATES PATENT OFFICE 2,647,256

RADAR SYSTEM

Walter Gerhard Heilpern, Zurich, and Ernst Vogt, Wallisellen, Switzerland, assignors to Societe Technique pour l'Industrie Nouvelle S. A. "Stin," Vevey, Switzerland, a Swiss corporation Application June 21, 1949, Serial No. 100,406
In Switzerland July 6, 1948

4 Claims. (Cl. 343—5)

This invention relates to radar systems and more particularly to a system which is especially adaptable for detection of a selected one of a plurality of targets or objects.

Heretofore, various arrangements have been proposed for the detection of moving objects such as airplanes, ships and the like. For example, radar systems which depend upon the reflection of microwaves from the surfaces of such objects have been extensively employed. In the use of such systems, the distance or range of the objects may be determined by impulse modulation of the transmitted waves and the measurement of the time interval between the transmission of the impulses and the reception of the reflected impulses. In addition, well-known methods of frequency modulation may be utilized for ascertaining the range. Determination of the position of the object in space, with such systems, may be accomplished by the bearing of the associated direction finding antennas.

In the operation of radar systems heretofore utilized, the microwaves employed are reflected from the surfaces of the distant objects, and the degree of reflection is governed to a large extent upon the character of the surfaces. Since all surfaces of the objects reflect the waves to a greater or lesser extent, it will be readily seen that the prior systems are incapable of distinguishing a certain selected target or object from several similar objects, or of detecting a selected object in the presence of other disturbing surfaces which cause undesirable reflections of the transmitted waves.

Accordingly, the principal object of the present invention is to provide a novel radar system which is so constituted as to avoid the objections and disadvantages referred to above.

Another object of the invention is to provide a radar system which is capable of detecting a certain selected object from a group of similar objects, the arrangement being such that undesired reflections of the waves from other surfaces and other objects, in the receiver, are avoided in a highly efficient manner.

Still another object is to provide in a system of the above character, a novel device arranged on the selected target which functions to change the polarization of the incident waves thus rendering the waves transferable. In this manner, the receiver, responding only to the altered direction of polarization, is not disturbed by reflections from other objects or surfaces which do not alter the direction of polarization.

A further object comprehends a target-carried polarization-changing device of the above character which while being of relatively simple construction, is still highly efficient in operation and avoids the necessity of any power source for its proper functioning.

Other objects and novel features of the invention will appear more fully hereinafter from the following detailed description when taken in connection with the accompanying drawings. It is to be expressly understood, however, that the drawings are utilized for purposes of illustration only and are not to be taken as a definition of the invention, reference being had for this purpose to the appended claims.

In the drawings, wherein similar reference characters refer to similar parts throughout the several views, Fig. 1 is a diagrammatic view illustrating the invention in connection with the identification of a harbor entrance and shoals for the use of ingoing and outgoing ships;

Figure 12:
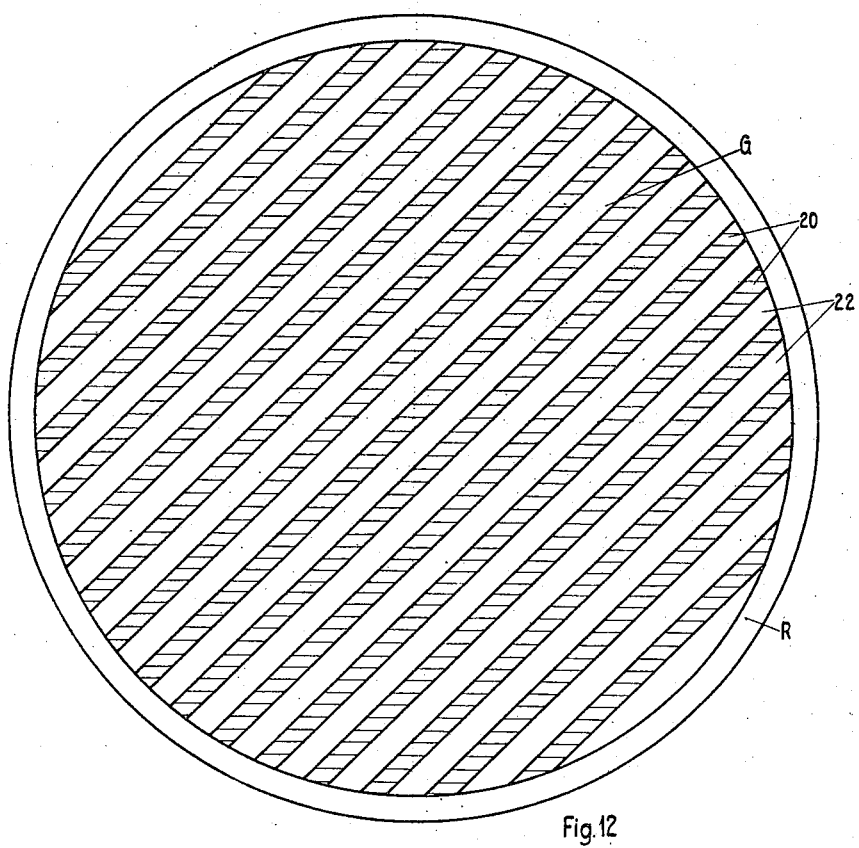
Figure 10:
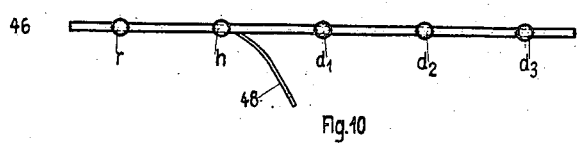

Figs. 8–11 are views of a Yagi antenna system which may be employed, Figs. 8 and 9 being front and side views of the transmitting antenna, and Figs. 10 and 11 being front and side views of the receiving antenna, which is displaced 90 degrees with respect to the transmitting antenna;

Fig. 12 is a front view of one form of the object-carried device or analyzer for varying the direction of polarization of the incident waves; and Fig. 13 is a side view of the device of Fig. 12.

According to the invention, the selected target or object is provided with a device which changes the polarization of the incident waves and reflects such waves to the receiver, the latter responding only to waves which are thus changed as to polarization. Such devices do not require any power source, are of relatively simple construction, and may be made of small dimensions. In the following description, such devices have been termed "analyzers" in analogy to the conventional devices for varying the polarization of visible light.

In addition to the analyzer, the complete system includes a transmitter and a receiver for the transmission and reception of electromagnetic waves of ultra high frequency. In contrast to the usual radar system, the transmitting and receiving antennas of the invention are capable of transmitting and receiving waves having different directions of polarization. Thus the object or target carrying the analyzer does not affect the receiver by variation of the wave amplitude but on the contrary, by variation of the polarization of the wave. This may be termed "polarization modulation."

The invention is most efficient when the transmitted waves are polarized in such a sense that the receiving antenna is completely insensitive to the direct transmission of the waves and to the simple reflection thereof without variation in polarization. This is especially the case when the transmitting antenna transmits linearly polarized waves and the receiving antenna only responds to waves which are linearly polarized at right angles to the transmitted waves. In this instance, therefore, the transmitting and receiving antennas may be located as close together as desired without any disturbing effect.

Antennas in the sense used herein are all oscillation circuits capable of radiating electromagnetic energy. Arrays of several antennas have the advantage of transmitting waves preferably in certain directions with greater intensity. The pattern may consist of a single beam in one direction only or omnidirectional in one plane only. In the region of microwaves the arrays are replaced by single antennas combined with suitable optical reflectors or by waveguides wherein the radiation energy may be amplified by horns, reflectors, slots, or other suitable means. Theoretically, transmitting and receiving antennas are of identical design. Their mutual spacing, however, may vary, so that transmitting and receiving antennas may be placed on the same or opposite sides of the analyzer, thus altering the polarization of either the transmitting or the reflected waves. In the latter instance, the device is particularly sensitive when transmitting and receiving antennas coincide locally. An example for such an antenna may be a waveguide for microwaves, where the transmitting and receiving probes are at right angles to each other.

The analyzer is designed to vary the polarization properties of the waves with the greatest possible efficiency. It may consist of antennas or arrays of antennas, resonance circuits or a combination of them. A relatively simple arrangement comprises a dipole system arranged in a plane at right angles to the direction of incidence of the waves, that is, a kind of diffraction grating, where the spacing and the length of the strips, which are preferably metallic conductors, are of the order of magnitude of the wave length. These gratings turn the plane of polarization of the linearly polarized waves if the polarization thereof is neither parallel nor perpendicular to the strips. If the arrangement of the transmitting and receiving antennas are such that the vectors of the radiating antenna currents are positioned at right angles to each other, the grating strips of the analyzer should bisect such angle in order to produce a maximum energy transfer. The gratings may also be used as additional polarization filters when linearly polarized waves are utilized.

In addition to the above, the analyzer of the present invention may be employed as a reflector for circularly or elliptically polarized waves which are transmitted and received by identical antennas. In such case, the receiving antenna cannot detect the waves reflected from disturbing surfaces because of the reversal of phase and of the sense of the circular or elliptical polarization caused by reflection. However, such antenna is sensitive to the waves reflected by the analyzer, the original polarization being transformed in linear polarization, which is a superposition of circularly or elliptically polarized waves of both senses of rotation. In like manner the analyzer may render the waves transferable between two such antennas for waves of different sense of circular or elliptical polarization if the antennas are positioned in front of each other.

Further, the analyzers may comprise resonance circuits in combination with antennas of different directions of polarization. As an example, a quadratic waveguide functioning in the range of microwaves may be employed, such waveguide being preferably provided with horns and reflectors. Such waveguide may contain two probes positioned at right angles to each other, so that one probe is sensitive to the polarization of the waves from the transmitting antenna and the other transmits waves of such polarization as to be capable of energizing the receiving antenna. Such probes may be externally connected by a tuned line which may be an auxiliary waveguide. In such case, the waves transmitted by the analyzer and received by the receiving antenna may be modulated by interruption, variation of the impedance, by signal or voice without local power source.

Figure 1:
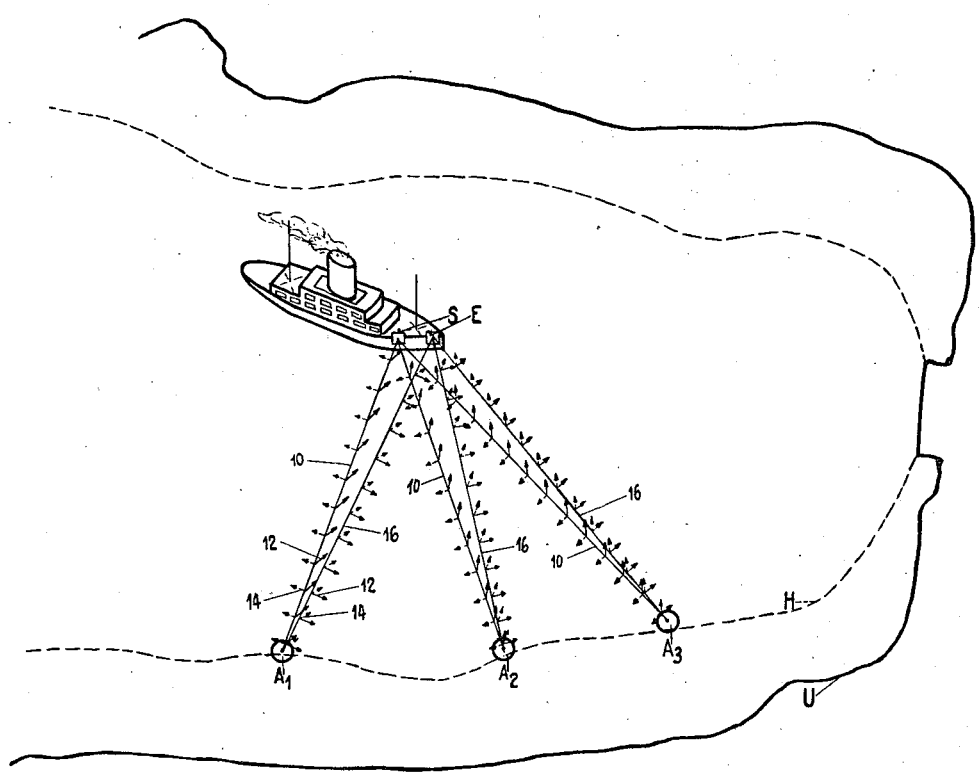

The invention is capable of a wide variety of uses, Fig. 1 illustrating an application in the field of water navigation for the identification of a harbor entrance and shoals for ingoing and outgoing ships. Referring to Fig. 1, the navigable zone of the harbor is illustrated by the boundary line H which is located outside the shore line U. A plurality of targets carrying the analyzers A1, A2 and A3, of the present invention are suitably spaced along the boundary line H, and the ship illustrated, is provided with a transmitter S and a receiver E.

In accordance with the invention, the transmitter S is arranged to transmit microwaves having a direction of propagation as shown by the lines 10, the transmitted waves being linearly polarized in one direction. For example, and as shown, the solid arrows 12 represent the vector of the electric field intensity while the arrows 14, arranged at right angles to the arrows 12, indicate the vector of the magnetic field intensity. From the foregoing, it will be understood, that the analyzers A1, A2 and A3 change the direction of polarization of the incident waves and the latter are reflected to the receiver E along lines 16. The change in polarization of the waves is herein shown to be of the order of 90°, in accordance with the changed direction of the arrows 12 and 14 for the reflected waves. Hence at the receiver, which is responsive only to the reflected waves having the changed polarization characteristic, the location of the objects on which the analyzers are mounted may be readily ascertained. With the arrangement proposed, the receiver E will not be affected by waves which are not reflected from the analyzers, since such waves are of the same polarization characteristic as the transmitted waves and the receiver is not responsive to the latter.

While the analyzers of the present invention may take any of the forms heretofore described, a comparatively simple embodiment of the grating type, is illustrated in Figs. 12 and 13. Therein, the analyzer G comprises a disk 18 of insulating material on which are cemented a plurality of spaced-apart strips 20 of metal foil such as silver. A metal disk R is positioned behind the disk 18 and functions as reflector. In the event that the wavelength of the transmitted wave is 10 cm., the strips 20 may be 1 cm. wide and the said strips may be spaced about 1 cm. apart. Disk 18 may be of the order of 30 cm. in diameter while the distance between the disk 18 and reflector R may be 2.5 cm. In the event that the transmitter and receiver are arranged to respectively transmit and receive waves which differ by an angle of 90° in their linear polarization characteristics, the arrangement of the grating strips 20 is preferably such that they bisect this angle, as illustrated.

Figure 2:
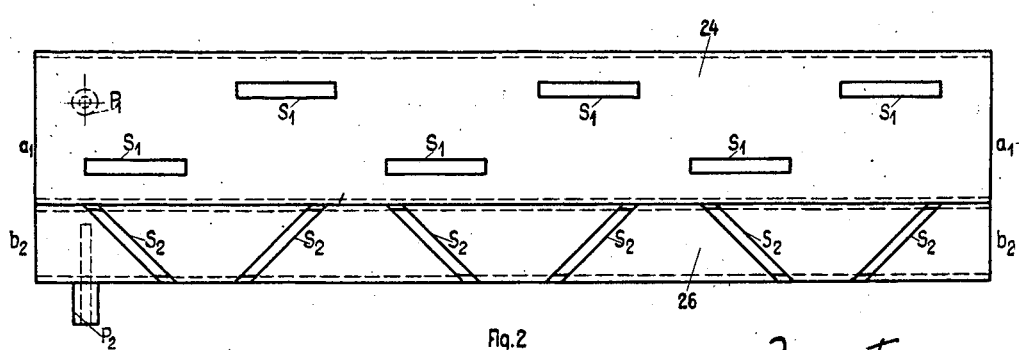
Fig. 2 is a front view of a transmitting and receiving antenna array of the slotted waveguide type which may be employed in the novel system.
Figure 3:
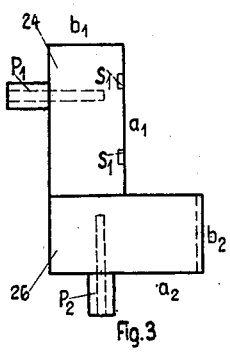
Fig. 3 is a side view of the antenna array of Fig. 2.

Different types of antenna arrays may be advantageously employed in the present invention. For example, and referring to Figs. 2 and 3, there is illustrated therein a slotted antenna system consisting of slotted transmitting and receiving waveguides 24 and 26 which are arranged at right angles to each other. As shown, the cross-sectional dimensions of the waveguide 24 are designated $a1$ and $b1$ and the waveguide is provided with slots S1 and a probe P1 for a cable connection. Waveguide 26 is provided with slots S2 and a probe P2 and the cross-sectional dimensions are designated $a2$ and $b2$.

Since the length and the spacing of the slots is materially affected by the wavelength, waveguides of the above character are suitable for a specific wavelength only. At least one cross-sectional dimension should be of the order of magnitude of the half-wavelengths, likewise the slot opening and spacing. For these reasons, this type of antenna is used for wavelengths of 50 cm. or less. In the event that the waveguides 24 and 26 are utilized for the transmission and reception of waves of the order of 10 cm. wavelength, it is advisable to choose $a1=a2$ and $b1=b2$ as well as equal length for the waveguides. The smaller dimensions $b1$ and $b2$ should be so small that for the given wavelength, no mode of cavity oscillation is possible at which the vector of the electric field intensity on the small side of the waveguide is vertical. Moreover, with the slots S2 located on the narrow side of the waveguide 26 and the slots S1 arranged on the wide side of the waveguide 24, the electromagnetic waves coupled with the vibrations in the waveguide will be linearly polarized at right angles to each other in accordance with the invention. It will be understood that slotted antennas of the foregoing type, that is of rectangular cross-section, transmit a directive beam the axis of which is perpendicular to the slotted surface. Cylindrical waveguides, on the other hand, uniformly provided with parallel slots over the circumference, operate as omni-directional antennas.

Figure 4:
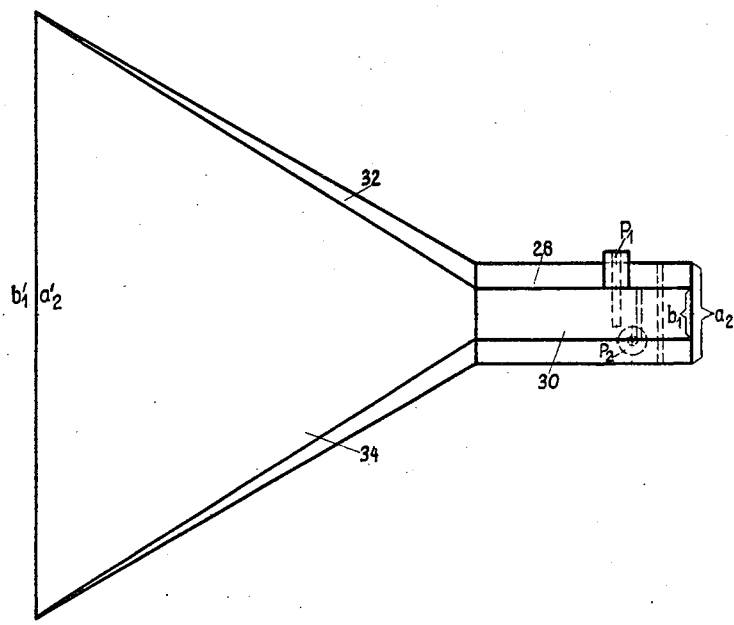
Fig. 4 is a top view of a different type of antenna array, the same including antennas of the horn type.
Figure 5:
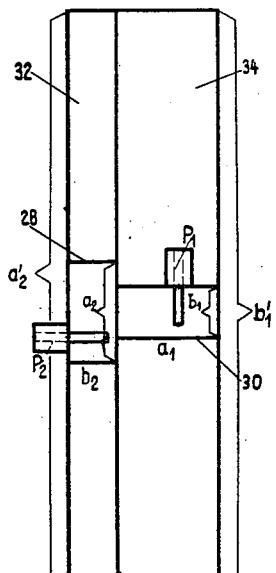
Fig. 5 is a side view of the antenna array of Fig. 4.

A further type of antenna which may be employed is of the horn type shown in Figs. 4 and 5. Such antennas comprise transmitting and receiving waveguides 28 and 30 which are arranged at right angles to each other and which are respectively provided with enlarged end portions 32 and 34 to increase radiation. Since one dimension of an antenna of this type must be of the order of magnitude of a half-wavelength and a satisfactory directional effect requires a large opening of the horn as respects the cross-section of the waveguide, such antennas are restricted to wavelengths of the order of 10 cm. or less. As shown, the waveguide 28 has dimensions $a2$, $b2$ and is provided with a probe P2 while the waveguide 30 has dimensions $a1$, $b1$ and a probe P1. If desired, horns which flare in both directions could be applied, but in such cases, the transmitting and receiving antennas could not be placed as close together as shown. The electric vectors are parallel to the directions of the probes P1 and P2 and keep this direction in space. Thus the emitted and the received waves are linearly polarized, the planes of polarization being perpendicular to each other.

Figure 6:
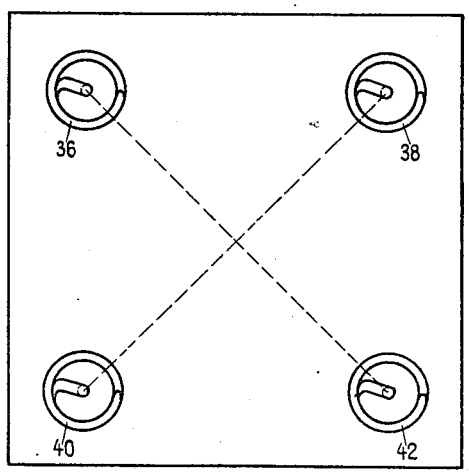
Fig. 6 is a front view of a further type of antenna array which may be employed, the same including antennas of the spiral type.
Figure 7:
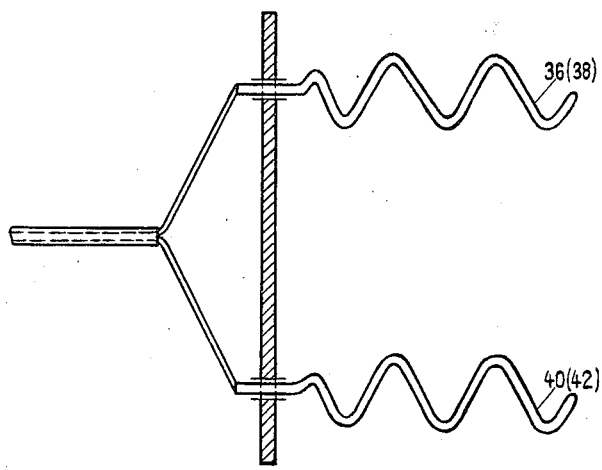
Fig. 7 is a side view of the antenna array of Fig. 6.

A still further antenna arrangement is shown in Figs. 6 and 7 which is adapted for the transmission of waves which are circularly or elliptically polarized. In such case, two entirely identical antennas are required for the respective transmission and reception of the energy. Preferably they are positioned side by side so that the axes of the spirals are parallel and the transmitting and receiving directions agree with each other. As shown, the array includes transmitting antennas 36 and 38 and receiving antennas 40 and 42. Such an array gives more efficient directivity and circular polarization than a single spiral. The spacing of the spirals may be about 1.5 times the wavelength while the length may be equal to the wavelength. Also the diameter of each spiral may be about ⅓ the wavelength while the pitch may be ⅙ thereof. Similar antennas may be efficiently used for wavelengths up to about 1 m.

For wavelengths of more than 1 m., the well-known Yagi antenna array may be employed. For example, and referring to Figs. 8–11, such an array includes a transmitting system 44 and a receiving system 46, these being arranged at right angles to each other as shown in Figs. 8 and 10. Each system comprises a driven half-wave dipole $h$ provided with a suitable lead 48, a reflector dipole $y$ and three directors $d1$, $d2$ and $d3$. The distance between the elements of the system depends upon the length of the director and reflector dipoles, the former being usually slightly shorter than the driven dipole while the reflector is usually slightly longer. As well understood, the beaming is in the plane of the elements of the system.

Insofar as transmitters and receivers are concerned, it is pointed out that circuits suitable for use with ultra high frequency waves may be utilized. However, a relatively inexpensive transmitting unit of sufficient strength for short ranges may include a microwave oscillator triode with flat electrodes of the lighthouse type, or a small reflex-Klystron, which are respectively modulated with power line frequency of 50–60 cycles per second, the plate voltage for the triode, or the reflector voltage for the Klystron. The receiver may include a silicon crystal diode as a rectifier for the high frequency, a transformer, a voltage amplifier tube of the pentode or double triode type for amplifying the low-frequency voltage, and a cold gas triode as a relay tube.

While the invention has been broadly described herein as being useful in connection with the detection of a certain selected object from a group of similar objects, or as an aid to ship navigation, it will be readily understood that a wide variety of applications may be resorted to. Illustrative examples are as follows.

1. Assuming that it is desired to detect a selected object or target which is equipped with an analyzer according to the present invention. Such analyzer changes the polarization characteristic of the incident waves and reflects the latter to the receiver which is arranged to receive the waves with the changed polarization. The transmitter, receiver and analyzer may be in any state of motion relative to each other. In such event the invention may be employed for the identification of the runway of a landing field, it being understood that the analyzers are placed along the runway while the transmitter and receiver area located on the airplane. In addition, the arrangement may be employed for taking a bearing on the leading airplane of a squadron or the flagship of a convoy. In such case, the analyzer is positioned on the object in question while the transmitter and receiver are located at the base station. In a further adaptation, the analyzers may be located on one or more specific vehicles such as aircraft, and the transmitting and receiving equipment may be positioned on the ground or on another vehicle. With this arrangement, detection of a certain type or group of vehicles, such as nationality, may be readily ascertained. In all the foregoing examples, the range of the object may be readily determined according to conventional methods such as frequency or impulse modulation of the high frequency waves employed. Hence with the range and direction of the object determined, its exact position may be readily obtained.

2. Further desirable applications of the invention lie in those cases where the motion of one object with respect to another is employed for the release of signals. For example, it may be desired to ascertain when the last car of a train has passed a certain spot along the track. In such case, the analyzer is carried by the last car while the transmitter and receiver are located at the particular spot. A further variation relates to the transmission of signals from the track to the train where the analyzer is carried by the signal. Here, several variations are possible depending upon the setting of the signals, it being readily understood that the polarization of the incident waves from the transmitter may be varied depending upon the setting of the analyzer. In a still further example, a stationary analyzer may be used as a signal and placed at a point along the track, while the transmitter and receiver are respectively located at a control station and on the train. In this case, the analyzer constitutes the signal and requires no power source or connection with the control station. It will be understood that in this case, the train can pick up the waves reflected from the signal only at the location of the latter.

In addition to the foregoing, it is to be pointed out that the analyzer of Figs. 12 and 13 may also be advantageously employed as a polarization filter where linear polarization is used. In such case, when the strips 20 are parallel to the electrical vector of the linearly polarized waves, the filter is opaque. On the other hand, when the strips 20 are arranged at right angles with such vector the filter is most transparent. Such filters may be advantageously positioned in front of the transmitting or receiving antennas so that improper directions of polarization caused by disturbing reflectors are excluded.

While several embodiments of the invention have been shown and described herein, it will be readily understood by those skilled in the art that various modifications may be resorted to without departing from the spirit thereof. Reference will therefore be had to the appended claims for a definition of the limits of the invention.

What is claimed is:

1. Apparatus for detecting a selected object from a group of objects, all of said objects being capable of reflecting incident high frequency electromagnetic waves, transmitting means including an antenna system arranged to transmit high frequency electromagnetic waves having a predetermined direction of polarization to said objects, receiving means including an antenna system arranged to receive waves having a direction of polarization different from said predetermined direction and being nonresponsive to the transmitted waves, and means separate from but carried by the selected object for changing the direction of polarization of the incident waves from said predetermined direction to said different direction thus rendering the waves transferable, said last named means including a stationary member having a plurality of spaced-apart metallic strips arranged thereon in parallel relationship.

2. Apparatus for detecting a selected object from a group of objects, all of said objects being capable of reflecting incident high frequency electromagnetic waves, transmitting means including an antenna system arranged to transmit high frequency electromagnetic waves having a predetermined direction of polarization to said objects, receiving means including an antenna system arranged to receive waves having a direction of polarization different from said predetermined direction and being non-responsive to the transmitted waves, and means separate from but carried by the selected object for changing the direction of polarization of the incident waves from said predetermined direction to said different direction and for reflecting the waves of different direction of polarization to said receiving means, said last named means including a stationary disk-like member of insulating material, a plurality of parallel, spaced-apart metallic strips secured to one face of said member and a plane reflecting surface positioned closely adjacent the opposite face of said member.

3. Apparatus for detecting from a base station, a selected object from a group of objects, all of said objects being capable of reflecting incident high frequency electromagnetic waves, comprising transmitting and receiving devices at the base station for respectively transmitting and receiving high frequency electromagnetic waves, said transmitting device including an antenna system for transmitting waves linearly polarized in a predetermined direction, and said receiving device including an antenna system for receiving reflected waves which are linearly polarized in a direction at right angles to said predetermined direction, said receiving antenna system thus being insensitive to the transmitted waves, and a device separate from but carried by the selected object for changing the polarization of the incident waves from the transmitting antenna from said predetermined direction to said direction at right angles thereto and for reflecting the changed waves to the receiving device, said device carried by the object including a stationary member having a plurality of spaced-apart metallic strips arranged thereon in parallel relationship.

4. Apparatus for detecting from a base station, a selected object from a group of objects, all of said objects being capable of reflecting incident high frequency electromagnetic waves, comprising transmitting and receiving devices at the base station for respectively transmitting and receiving high frequency electromagnetic waves, said transmitting device including an antenna system for transmitting waves linearly polarized in a predetermined direction and said receiving device including an antenna system for receiving reflected waves which are linearly polarized in a direction at right angles to said predetermined direction, said receiving antenna system thus being insensitive to the transmitted waves, and a device separate from but carried by the selected object for changing the polarization of the incident waves from the transmitting antenna from said predetermined direction to said direction at right angles thereto and for reflecting the changed waves to the receiving device, said device carried by the object including a stationary disk-like member of insulating material, a plurality of parallel, spaced-apart metallic strips secured to one face of said member and a plane reflecting surface positioned closely adjacent the opposite face of said member.

WALTER GERHARD HEILPERN.
ERNST VOGT.

References Cited in the file of this patent

UNITED STATES PATENTS

| Number | Name | Date |
|---|---|---|
| 2,408,848 | Hammond | Oct. 8, 1946 |
| 2,412,631 | Rice | Dec. 17, 1946 |
| 2,421,028 | King | May 27, 1947 |
| 2,423,644 | Evans | July 8, 1947 |
| 2,461,005 | Southworth | Feb. 8, 1949 |
| 2,472,212 | Hudspeth | June 7, 1949 |
| 2,472,782 | Albersheim | June 14, 1949 |
| 2,473,613 | Smith | June 21, 1949 |
| 2,502,394 | Smith | Mar. 28, 1950 |
| 2,508,571 | Hudspeth | May 23, 1950 |
| 2,530,098 | Van Atta | Nov. 14, 1950 |
| 2,588,249 | Kock | Mar. 4, 1952 |

FOREIGN PATENTS

| Number | Country | Date |
|---|---|---|
| 668,231 | Germany | Nov. 28, 1938 |